United States Patent
Dubray et al.

(10) Patent No.: US 12,411,210 B2
(45) Date of Patent: Sep. 9, 2025

(54) DEVICE FOR DISTANCE MEASUREMENT AND METHOD FOR FUNCTIONALLY CHECKING A DEVICE FOR DISTANCE MEASUREMENT

(71) Applicant: KROHNE S.A.S., Romans-sur-Isère (FR)

(72) Inventors: Olivier Dubray, Chatuzange-Le-Goubet (FR); Samuel Grosdidier, Beauregard-Baret (FR)

( * ) Notice: Subject to any disclaimer, the term of this patent is extended or adjusted under 35 U.S.C. 154(b) by 366 days.

(21) Appl. No.: 18/069,306

(22) Filed: Dec. 21, 2022

(65) Prior Publication Data

US 2023/0204718 A1    Jun. 29, 2023

(30) Foreign Application Priority Data

Dec. 23, 2021   (DE) .................. 10 2021 134 451.4

(51) Int. Cl.
*G01S 7/40*       (2006.01)
*G01S 13/08*     (2006.01)

(52) U.S. Cl.
CPC ............... *G01S 7/40* (2013.01); *G01S 13/08* (2013.01)

(58) Field of Classification Search
CPC .................................. G01S 7/40; G01S 13/08
See application file for complete search history.

(56) References Cited

U.S. PATENT DOCUMENTS

| | | | |
|---|---|---|---|
| 3,229,286 A | 1/1966 | James et al. | |
| 4,126,861 A * | 11/1978 | Witte | G01S 13/582 342/134 |
| 4,360,812 A | 11/1982 | Peperone | |
| 6,087,979 A | 7/2000 | Magori et al. | |
| 8,847,816 B2 * | 9/2014 | Feil | G01F 23/284 342/174 |
| 11,099,051 B2 | 8/2021 | Vogt et al. | |
| 2016/0178733 A1 * | 6/2016 | Langendorf | G01F 23/284 342/167 |

FOREIGN PATENT DOCUMENTS

| | | |
|---|---|---|
| DE | 102014107249 A1 | 11/2015 |
| DE | 102017123185 A1 | 4/2019 |
| EP | 0167505 A2 | 1/1990 |
| WO | 2015176889 A1 | 11/2015 |

\* cited by examiner

*Primary Examiner* — William Kelleher
*Assistant Examiner* — Hailey R Le
(74) *Attorney, Agent, or Firm* — Patrick D. Duplessis

(57) ABSTRACT

A device for distance measurement includes a signal generator for generating a signal, a transmitting antenna for transmitting the signal, a receiving antenna for receiving a received signal, a first mixer, an evaluation unit, and a diagnostic unit having a diagnostic line. The first mixer mixes the signal and the received signal. The signal generator is connected to the diagnostic line and the signal is a diagnostic signal after passing through a delay element of the diagnostic line. The diagnostic signal is mixed with the signal in the first mixer or a second mixer to form a diagnostic mixed signal. The output of the first mixer, and the output of any second mixer, is or are connected to the evaluation unit, which uses the diagnostic mixed signal to check functionality of the signal generator and/or the evaluation algorithm.

14 Claims, 3 Drawing Sheets

DEVICE FOR DISTANCE MEASUREMENT AND METHOD FOR FUNCTIONALLY CHECKING A DEVICE FOR DISTANCE MEASUREMENT

TECHNICAL FIELD

The invention relates to a device for distance measurement, in particular a radar fill level measuring device, comprising at least one signal generator for generating an electromagnetic measurement signal, at least one transmitting antenna for transmitting the measurement signal and at least one receiving antenna for receiving a received signal, wherein the signal generator is connected at least to the transmitting antenna; comprising at least a first mixer, wherein a first input of the first mixer is connected to the signal generator and wherein a second input of the first mixer is connected at least to the receiving antenna, such that, during operation, the first mixer mixes at least the measurement signal generated by the signal generator and the received signal received by the receiving antenna; and further comprising an evaluation unit.

Furthermore, the invention relates to a method for checking the functionality of a device for distance measurement.

BACKGROUND

Devices for distance measurement, such as fill level measuring devices, are known from the prior art. Generic devices determine a distance to be measured mostly based on the propagation time of an electromagnetic measurement signal.

In this context, generic devices may have internal defects that are due, for example, to an incorrectly functioning signal generator or an incorrectly functioning evaluation unit, so that a measured value can be determined and displayed, but this measured value has an increased measurement error. The increased measurement error is not necessarily apparent in the displayed measured value. In particular, if the measurement error is small and the displayed measured value nevertheless appears plausible, such an internal measurement error can remain undetected.

It is known from the prior art to provide mechanical targets, for example reference reflectors installed in containers, for checking devices for distance measurement, which cause a reference reflection of the measurement signal.

If the reference reflection and the distance corresponding to the reference reflection are measured during evaluation of the received signal, it can be assumed that the signal generator and the evaluation unit, and in detail also the evaluation algorithm, are functioning correctly. However, the function check is thus bound to the mechanical design of the measurement environment and can still only be carried out in combination with the emission of the measurement signal into the measurement environment.

An FM-CW radar system for distance measurement with a transmitting and a receiving antenna is known from the document U.S. Pat. No. 4,360,812 A, wherein, in a first mixer, the measurement signal transmitted by the signal generator and the received signal received by the receiving antenna are mixed. In addition, a second mixer is provided which mixes the measurement signal emitted by the signal generator with a comparison signal. The comparison signal is generated by passing the measurement signal through a delay line. The output signals of the two mixers are then compared in a third mixer. In this process, the delay line simulates a distance that serves as a limit value for an event to be triggered, for example the detonation of a detonator. Overall, therefore, a limit value is generated by the presence of the delay line, and falling below or exceeding of this limit value is determined by comparison with the received signal.

The publication U.S. Pat. No. 3,229,286 A also discloses an FM-CW radar system having a transmitting antenna and a receiving antenna, wherein the generated measurement signal is mixed with the received signal received from the receiving antenna via a first mixer. In addition, a control unit that controls the frequency variation of the transmission of the measurement signal is provided, wherein the control unit is fed by the output of the first mixer. Furthermore, the measurement signal is led through a directional coupler on a second line directly to a second mixer and to a delay line. Due to the presence of the control unit, the emitted measurement signal contains the distance information of the object to be measured, which is determined and displayed via this second line.

Furthermore, a fill level measuring device is known from the publication EP 0 167 505 A2, wherein a part of the generated measurement signal is passed through a delay unit simulating a known length, and wherein the delayed reference signal is coupled to the received signal for determining the distance of the object to be measured.

The publication U.S. Pat. No. 6,087,979 A discloses a device for distance measurement with improved coherence length, wherein the measurement signal, before being mixed with the received signal in a mixer, is delayed in a delay unit. Alternatively, the radar measurement signal is mixed with the transmitted measurement signal in a second mixer, wherein the evaluation unit determines a correction of the delay unit from the signal of the second mixer present at the output, so that the delayed measurement signal and the received signal lie within the coherence length.

SUMMARY

Based on the prior art set forth, an object of the invention is to provide a device for distance measurement which has improved measurement accuracy. Furthermore, it is an object of the invention to disclose a method for checking functionality of the device for distance measurement.

According to a first teaching of the present invention, the object set out above is achieved by a device for distance measurement described at the beginning in that an integrated diagnostic unit is present, wherein the diagnostic unit has at least one diagnostic line, wherein the signal generator is connected to the diagnostic line in such a way that, during operation, the measurement signal generated by the signal generator is at least partially coupled into the diagnostic line, that the diagnostic line has at least one delay element, wherein the measurement signal is formed as a diagnostic signal after at least one pass through the delay element during operation, and that the diagnostic line is connected to the first mixer or to a second mixer, so that, during operation, the diagnostic signal is mixed with the measurement signal in the first mixer or in the second mixer to form a diagnostic mixed signal, that the output of the first mixer, and if present the output of the second mixer, is or are connected to the evaluation unit, and that the evaluation unit is designed in such a way that it uses the diagnostic mixed signal to check the functionality of the signal generator and/or of the evaluation algorithm.

The measurement signal generated by the signal generator is an electromagnetic signal, in particular a radar measurement signal, particularly preferably an FM-CW radar measurement signal.

According to the invention, it has been recognized that a reference element integrated in the measuring arrangement of the device for distance measurement in the form of a known delay of the measuring signal is advantageous in that no additional mechanical element needs to be present outside the device in order to check the correct functionality of the device. By means of such an integrated diagnostic unit, the correct functionality of the device can thus be checked in a particularly flexible manner independently of the mechanical design of the measuring environment and also independently of the actual emission of the measuring signal into the measuring environment.

Such a functional check according to the invention is particularly relevant for fulfilling the requirements within the framework of functional safety (SIL).

If the evaluation unit for checking the functionality determines, from the diagnostic mixed signal, the difference frequency generated by the delay element, i.e. the specified difference frequency, this is evidence of the correct functionality of the signal generator. If, in addition, the distance simulated by the delay element can be determined from the diagnostic signal, this is further confirmation that the evaluation algorithm is working correctly.

As a result, the integrated verification of the correct functionality of the device according to the invention can ensure an improved accuracy of the measured values output by the device, since even small measurement errors that are due to internal malfunctions can be detected.

According to a first design, the transmitting antenna and the receiving antenna are designed as a common transmitting and receiving antenna, i.e. as an antenna that both transmits the measurement signal and receives the received signal. This design has the advantage that the measuring arrangement of the device according to the invention can be designed to be particularly compact.

According to an alternative design, the device has a transmitting antenna for transmitting the measurement signal and a receiving antenna formed separately from the transmitting antenna for receiving a received signal reflected at an object.

Particularly preferably, at least one coupling element is provided, wherein the signal generator is at least connected to the transmitting antenna via the coupling element, so that, during operation, the measurement signal is at least partially transmitted to the transmitting antenna via the coupling element, and wherein the signal generator is connected to the diagnostic line via the coupling element, so that, during operation, the measurement signal is at least partially transmitted to the diagnostic line via the coupling element.

According to a particularly preferred design of the device according to the invention, the transmitting antenna and the receiving antenna are designed as a common transmitting and receiving antenna and, during operation, the receiving signal is further transmitted to the first mixer via the coupling element. This embodiment has the advantage that the existing lines of the measuring arrangement can be used at least partially both for the measuring arrangement for the usual distance measurement and for the diagnostic unit. This device is thus designed to be particularly compact overall.

According to one design of the device, the coupling element is designed as a directional coupler, preferably with four ports $P_1$, $P_2$, $P_3$ and $P_4$. Alternatively, the directional coupler may have fewer gates, for example three gates $P_1$, $P_2$ and $P_3$, or more gates, for example five gates $P_1$, $P_2$, $P_3$, $P_4$ and $P_5$.

If the directional coupler has four ports $P_1$, $P_2$, $P_3$ and $P_4$, the measurement signal passing through the directional coupler is decoupled into different ports depending on the direction of travel of the measurement signal.

In detail, according to one design, a measurement signal that couples into the directional coupler through port $P_1$ is coupled out both through port $P_2$ in the direction of the transmitting and receiving antenna and through port $P_4$ into the diagnostic line. The received signal, in turn, couples into the directional coupler through port $P_2$ and is further coupled out through port $P_3$ in the direction of the first mixer. A small portion of the received signal may also be coupled out via port $P_1$ in the direction of the signal generator, although this part is not used further during operation.

According to a further design, the directional coupler can have four ports $P_1$, $P_2$, $P_3$ and $P_4$, wherein a measurement signal coupled into the directional coupler through port $P_1$ is coupled out both via port $P_2$ in the direction of the transmit antenna and via port $P_4$ into the diagnostic line. The separately formed receiving antenna is directly connected to the first mixer.

According to a next advantageous design, the coupling element is formed asymmetrically in such a way that the signal transmission into the individual ports is weighted differently, preferably between 60% and 80% of the incoming power of the measurement signal being transmitted into the port in the direction of the transmitting antenna during operation. Particularly preferably, the rest of the power is coupled into the diagnostic line via another port. Depending on the application, a higher or lower proportion of the measurement signal can also be transmitted in the direction of the transmitting antenna. For example, a proportion of about 50% of the power of the measurement signal can be transmitted in the direction of the transmitting antenna and about 50% of the power in the direction of the diagnostic line.

When the preceding designs refer to a transmitting antenna, the transmitting antenna can be a separate transmitting antenna or a transmitting and receiving antenna.

According to a next advantageous design, the diagnostic line is limited by a reflection element. The reflection element is arranged behind the delay element in the direction of propagation of the measurement signal, so that the diagnostic signal passes through the delay element again after reflection at the reflection element. In total, the diagnostic signal thus passes through the delay element twice. Particularly preferably, the diagnostic signal is fed into the first mixer after reflection at the reflection element, wherein the diagnostic signal is fed into the first mixer via the same line as the received signal.

Overall, according to one design, a linear combination of the diagnostic signal and the received signal is fed into the first mixer. According to another embodiment, the diagnostic signal is fed into the first mixer via the same line as the receive signal, but due to the design of the delay element, there is a time offset between the diagnostic signal and the receive signal, so that the two signals can be evaluated separately.

This design has the advantage that there is no need for a second mixer to mix the diagnostic signal with the measurement signal. Thus, a particularly large part of the existing lines can be used both for the measuring arrangement for the usual distance measurement and for the diagnostic unit.

According to one design, in order to check a correct functionality of the device for distance determination, the evaluation unit determines the frequency of the diagnostic mixed signal. If the determined frequency matches a reference frequency value stored in the evaluation unit, it can be assumed that the signal generator is functioning correctly.

Alternatively or additionally, the evaluation unit determines the distance simulated with the delay element from the diagnostic mixed signal. If the distance determined in this way matches a stored value, it can be assumed that the evaluation algorithm is also functioning correctly.

According to one design, the evaluation unit has various units. The evaluation unit has at least a first signal receiving unit which is connected to the output of the first mixer. Furthermore, the evaluation unit comprises a first computing unit with the evaluation algorithm, which is connected to the first signal receiving unit.

Optionally, the evaluation unit comprises a second signal receiving unit connected to the output of the second mixer. Optionally, a second computing unit is provided with the diagnostic algorithm. In addition, a memory unit is provided in which reference values are stored.

According to a further preferred design, the delay element is designed in such a way that the diagnostic signal has a frequency difference from the received signal, so that the distance simulated by the delay element corresponds to a distance that is not in the usual measuring range. The usual measuring range is the area in front of the transmitting antenna in which a target to be captured is located. This design ensures that the evaluation of the diagnostic signal can be distinguished from the evaluation of the received signal, even if the two signals are fed to the evaluation unit via the same line. In particular in the case in which the linear combination of the diagnostic signal and the received signal is mixed with the measurement signal in the first mixer, this design is advantageous. Moreover, according to this design, checking the functionality of the device can be performed simultaneously with the usual distance measurement.

According to a further design, the delay element is formed as a waveguide or as a slow wave waveguide or as a microstrip line or as a coaxial line.

According to a next design, at least two delay elements are present, which are integrated into the diagnostic line in parallel or in series. For example, an RF switch can be arranged in front of the delay elements, wherein each output is connected to a delay element and wherein the delay elements differ. By allowing the output to be selected during operation, the delay element can be adjusted or changed. It is also conceivable that the at least one delay element is designed to be adjustable so that the simulated distance can be adapted to the respective application.

Particularly preferably, the evaluation unit is designed to perform one of the methods described below.

In principle, all statements made with respect to the device according to the present invention apply equally to the method described below, and vice versa.

According to a second teaching of the present invention, the object mentioned at the beginning is achieved by a method described at the beginning for checking functionality of a device for distance measurement in that the device is designed according to one of the designs described above and the method comprises the following steps:
emitting an electromagnetic measurement signal by the signal generator, wherein a part of the measurement signal is fed into the first mixer and wherein a part of the measurement signal is coupled into the diagnostic line so that the measurement signal passes through the delay element at least once and thus becomes the diagnostic signal, and optionally feeding the measurement signal into a second mixer, mixing the diagnostic signal with the measurement signal in the first mixer or in the second mixer and generating a diagnostic mixed signal, detecting and evaluating the diagnostic mixed signal by the evaluation unit, wherein the evaluation unit determines the frequency of the diagnostic mixed signal for evaluation and compares it with a reference value and/or wherein the distance corresponding to the delay element is determined from the diagnostic mixing signal and compared with a reference value.

According to the invention, it is determined for checking functionality whether the evaluation of the diagnostic signal matches predetermined values for the frequency deviation or the simulated distance. If the frequency matches the stored reference value, it can be concluded that the signal generator is functioning correctly. If the measured distance also matches the specified distance, this proves that the evaluation algorithm is also working correctly. It is assumed that the algorithm for determining the simulated distance also evaluates the received signal during operation.

In addition to the evaluation of the frequency and/or the distance, other parameters of the diagnostic signal can also be captured to check the correct functionality of the device. For example, the shape of the diagnostic signal can be compared with the shape of the reference signal.

If the measured frequency of the diagnostic mixed signal deviates from the stored frequency value taking into account a tolerance range and/or the measured distance deviates from the stored reference distance taking into account a tolerance range, it can be assumed that there is an internal error. If the peak width of the diagnostic signal deviates from the peak width of the reference signal, taking into account a tolerance range, this is an indication of an error in the width of the transmitted frequency ramp.

This can be communicated to the user, for example, via a display unit. Alternatively or additionally, there may be an interface, in particular a current interface, via which the error message is output. Alternatively or additionally, a relay can be present that can be set to an error state in the event of an error.

Alternatively or additionally, the deviation of the measured frequency from the stored value and/or the deviation of the measured distance from the stored reference distance can be determined and the deviation determined in this way is used to correct the displayed measured value.

Particularly preferably, the procedure is carried out for each measurement operation or periodically or upon request of the user. In this respect, checking functionality can be carried out at the same time as or with a time delay from the usual distance measurement.

According to one design, the signal at the second input of the first mixer corresponds to a linear combination of the received signal and the diagnostic signal, so that at the first mixer the linear combination is mixed with the measurement signal to form a combined mixed signal. This design of the method assumes a device in which the diagnostic line is limited by a reflective element so that the diagnostic signal is fed back into the first mixer.

Particularly preferably, the delay element is then designed in such a way that the frequency of the diagnostic signal and the received signal differ, so that the distance simulated by the delay element corresponds to a distance that is not in the usual measurement range and so that the evaluation unit extracts the diagnostic mixed signal based on the frequency difference from the combined mixed signal.

BRIEF DESCRIPTION OF THE DRAWINGS

There is now a plurality of possibilities for designing and further developing the device and method according to the invention. In this respect, reference is made to the following description of preferred embodiments in conjunction with the drawings.

DETAILED DESCRIPTION

Figure 1:
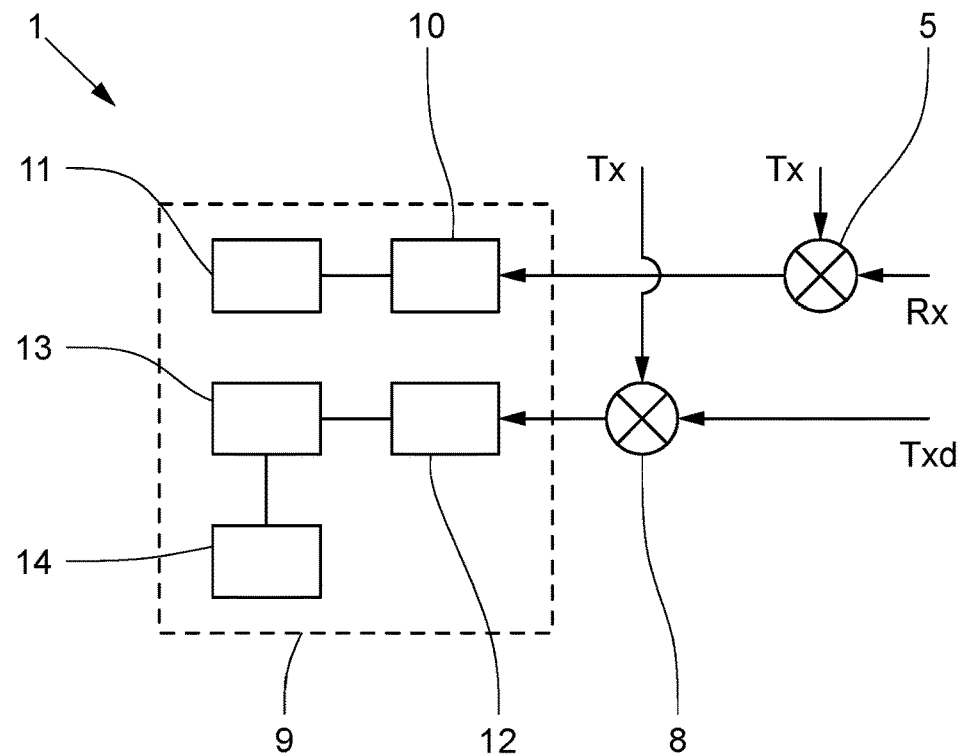
FIG. 1 illustrates a first embodiment of a device according to the invention.

FIG. 1 shows a first embodiment of a device 1 for distance measurement, wherein the signal generator and the transmitting or receiving antenna are not shown. Rather, FIG. 1 schematically shows the evaluation unit 9 of the device 1 as well as a first mixer 5 and a second mixer 8, which feed signals to the evaluation unit 9 for evaluation. In detail, there is a first mixer 5 in which the measurement signal Tx emitted by the signal generator 2 is mixed with the reflected received signal Rx. The mixed signal from the first mixer 5 is fed to a first signal receiving unit 10 and evaluated in a first computing unit 11 by means of the usual measurement algorithm.

In addition, a second mixer 8 is provided in which the measurement signal Tx emitted by the signal generator 2 is mixed with the diagnostic signal, i.e. the delayed measurement signal Txd, to form a diagnostic mixed signal. The mixed diagnostic signal is fed to a second signal receiving unit 12 and evaluated in a second computing unit 13 using a diagnostic algorithm. The diagnostic algorithm determines the frequency of the diagnostic mixing signal and/or the distance corresponding to the delay element 7 and compares the determined frequency and/or the determined distance with a reference value stored in a memory 14.

In this respect, the illustrated device 1 shows at least part of a diagnostic unit integrated in the measuring arrangement, by means of which the functionality of at least the signal generator 2 can be checked.

Figure 2:
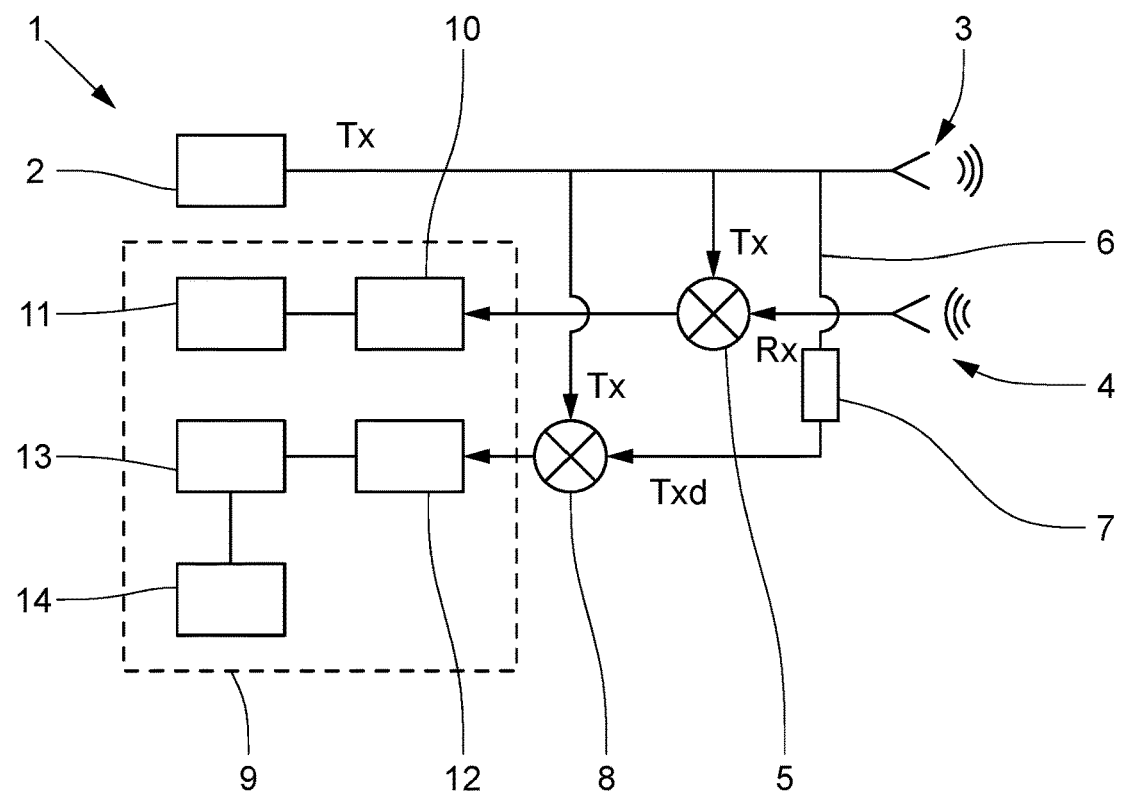
FIG. 2 illustrates a next embodiment of a device according to the invention.

FIG. 2 shows a next embodiment of a device 1 for distance measurement with a signal generator 2 for generating a measurement signal Tx. The signal generator 2 is connected to a transmitting antenna 3 which transmits the measurement signal Tx. Furthermore, the measurement signal Tx is fed to a first mixer 5 and a second mixer 8.

A receiving antenna 4 is provided for receiving a received signal Rx reflected at an object. The receiving antenna 4 is connected to the second input of the first mixer 5, so that the measuring signal Tx and the receiving signal Rx are mixed by the first mixer 5. The mixture of these two signals is fed into a first signal receiving unit 10 and evaluated in a first computing unit 11 by means of the usual measurement algorithm.

The measurement signal Tx is also fed into a diagnostic line 6. The diagnostic line 6 has a delay element 7, wherein the diagnostic signal Txd is produced by the measurement signal Tx passing through the delay element 7. Thus, the diagnostic signal Txd corresponds to a delayed measurement signal. The diagnostic signal is mixed with the measurement signal Tx in a second mixer 8 to form a diagnostic mixed signal. The mixed diagnostic signal is fed to a further signal receiving unit 12 and evaluated in a second computing unit 13. To verify correct functionality of the device, the frequency and/or the distance corresponding to the delay element determined by the computing unit 13 is compared with a reference value stored in a memory 14. If the values determined by the computing unit, taking into account a tolerance range, match the stored reference value or values, it can be assumed that at least the signal generator is functioning correctly.

Figure 3:
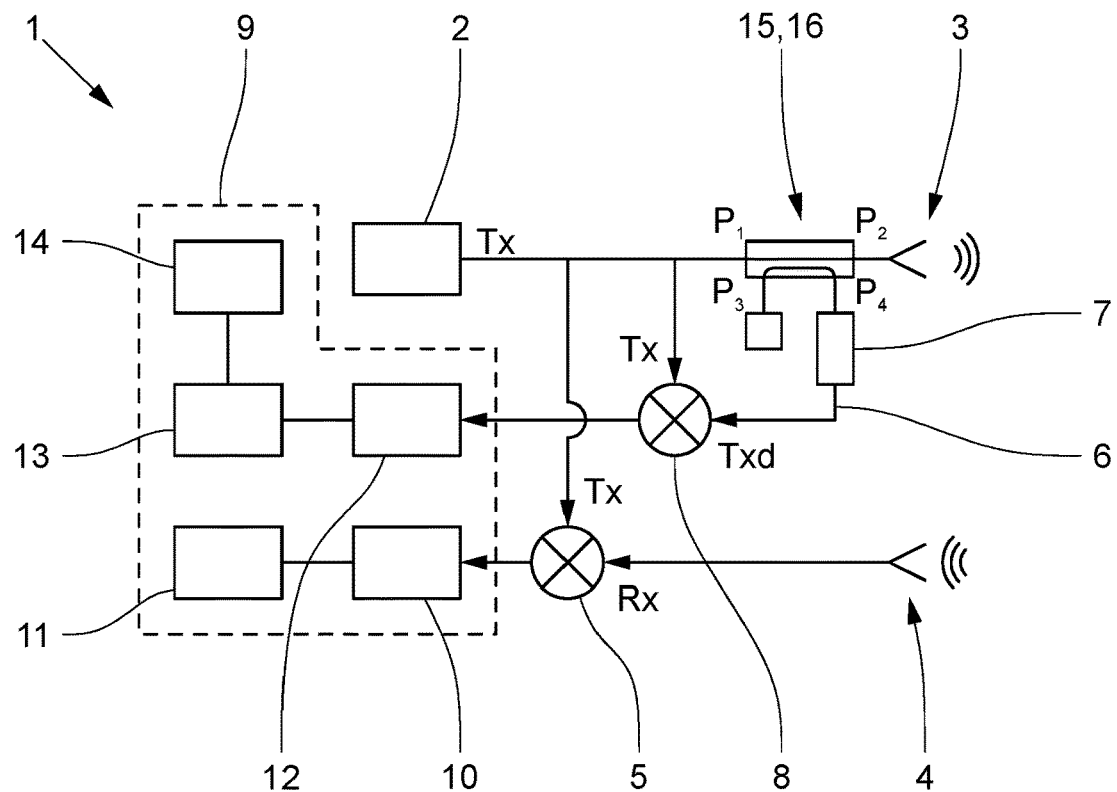
FIG. 3 illustrates a further embodiment of a device according to the invention.

FIG. 3 shows a further embodiment of a device 1 for distance measurement with an integrated diagnostic unit. The device 1 has a signal generator 2 for generating the measurement signal. The signal generator 2 is connected to the transmitting antenna 3 via a coupling element 15 in the form of a directional coupler 16. As in the previously shown embodiments, the measurement signal is supplied to the first mixer 5 and the second mixer 8. In addition, the measurement signal Tx is coupled into port $P_1$ of the directional coupler 16. Via port $P_2$, the measurement signal Tx couples out in the direction of the transmitting antenna 3. In addition, the measurement signal Tx couples into the diagnostic line 6 via port $P_4$. After passing through delay element 7, the delayed measurement signal is formed as diagnostic signal Txd. The diagnostic signal is mixed with the measurement signal Tx in the second mixer 8. The mixture of these signals is fed to a second signal receiving unit 12. As described previously, the functionality of the device 1 is determined from the evaluation of this diagnostic mixed signal.

Furthermore, a separately formed receiving antenna 4 is provided, which receives the reflected received signal Rx and forwards it to the first mixer 5. In a usual manner, the mixed signal generated from in the first mixer 5 is fed to a first signal receiving unit 10 and evaluated.

Figure 4:
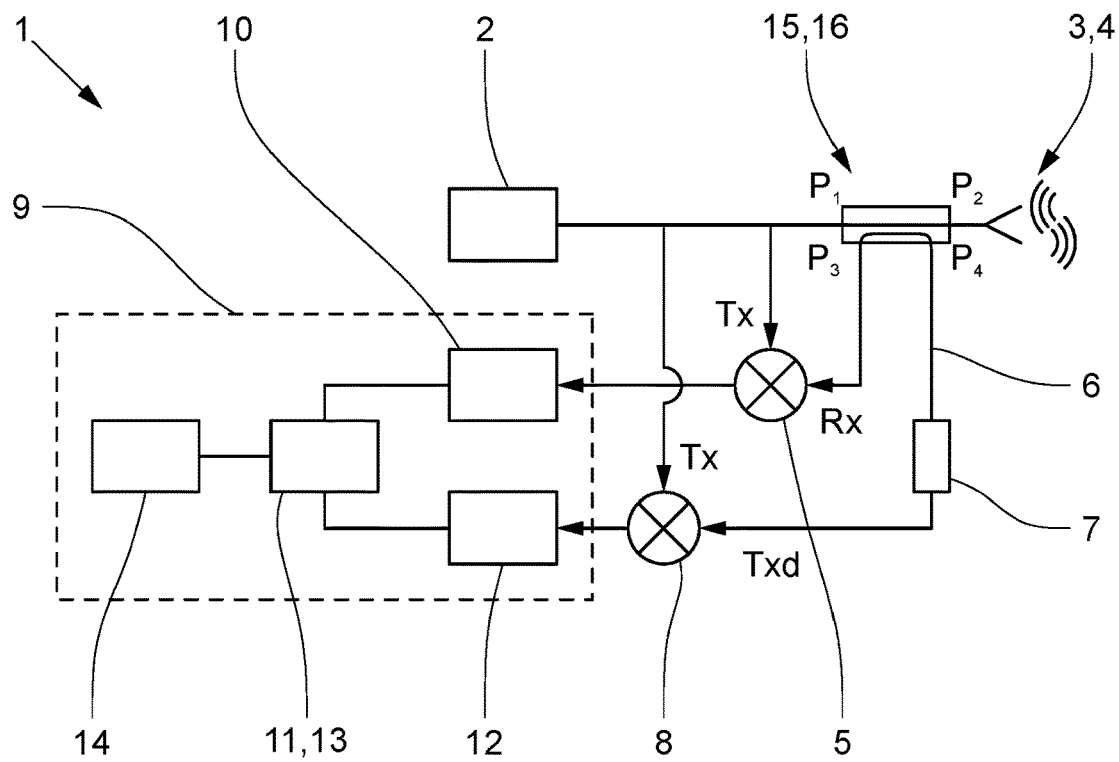
FIG. 4 illustrates a further embodiment of a device according to the invention.

In contrast to the previously described embodiments, the device shown in FIG. 4 has a transmitting and receiving antenna 3, 4, i.e. a single antenna that fulfills both functions. Via the directional coupler 16, the measurement signal is coupled from port $P_1$ via port $P_2$ into the transmitting and receiving antenna 3, 4 and, furthermore, via port $P_4$ into the diagnostic line 6. Furthermore, the diagnostic mixed signal is mixed with the measurement signal Tx in the second mixer 8 as already described and the diagnostic mixed signal is fed to a second signal receiving unit.

The received signal Rx couples into the directional coupler 16 via port $P_2$ and out via port $P_3$ in the direction of the first mixer 5. Subsequently, the mixed signal is forwarded into the signal receiving unit 10 and evaluated. In contrast to the previously described embodiments, the mixed signals from mixers 5 and 8 are evaluated in the same computing unit, i.e. by the same algorithm. In this respect, both the functionality of the signal generator and the correct operation of the evaluation algorithm can be checked by the diagnostic unit shown.

For this, the delay element 7 is designed in such a way that the frequency deviation of the diagnostic signal differs from the frequency deviation of the received signal, so that the propagation times of the diagnostic signal and the received signal also differ.

Alternatively, the mixers 5, 8 and/or the signal receiving units 10, 12 are designed in such a way that they forward the respective mixed signal only intermittently, so that the individual superposition signals are evaluated in different time windows.

Alternatively, the computing unit or algorithm is designed such that the computing unit or algorithm evaluates the signals from the signal receiving units 10, 12 separately, for example one after the other.

This ensures that the superposition signals from the individual mixers 5, 8 can be evaluated separately.

Figure 5:
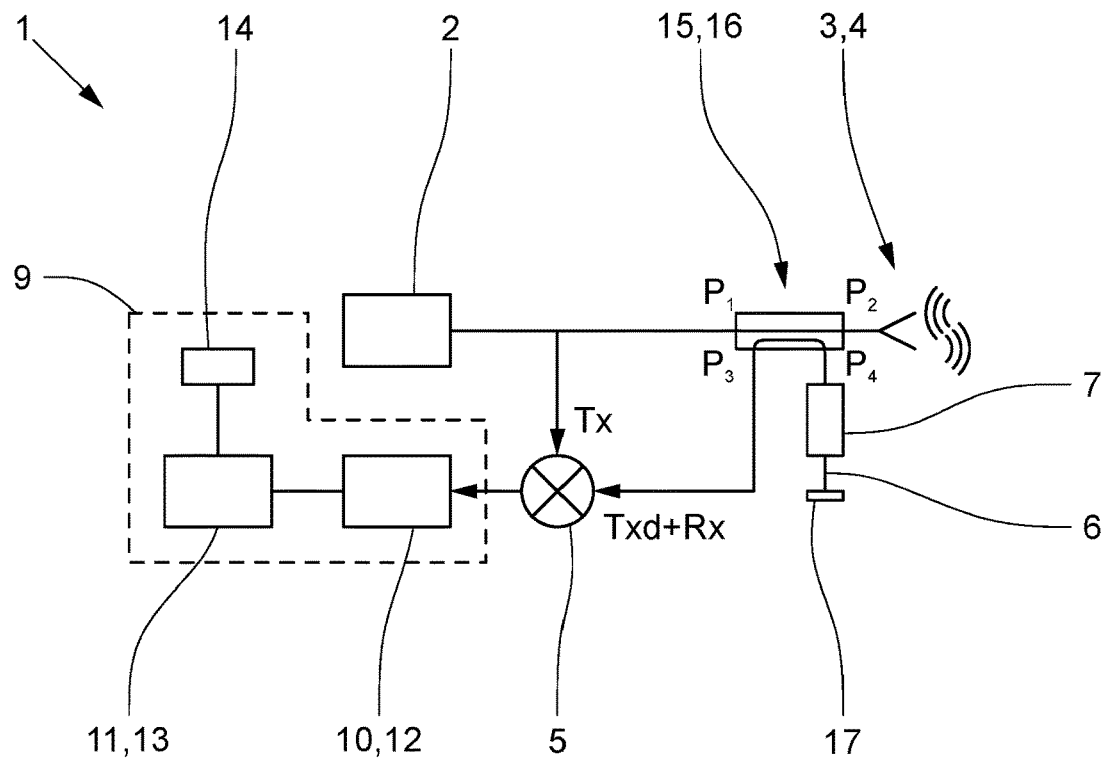
FIG. 5 illustrates a further embodiment of a device according to the invention.

According to the embodiment shown in FIG. 5, there is also a transmitting and receiving antenna 3, 4 as well as a directional coupler 16, so that during operation the measurement signal emitted by the signal generator 2 is coupled out both in the direction of the transmitting and receiving antenna 3, 4 and in the diagnostic line 6. Behind the delay element 7, the diagnostic signal is reflected at a reflective element 17 and again passed through the delay element 7. Subsequently, the diagnostic signal is fed to the first mixer 5 via the same line as the received signal, so that a linear combination of the received signal and the diagnostic signal is present overall at the second input of the first mixer 5.

The mixed signal of the first mixer 5 is fed to the signal receiving unit 10, 12 and evaluated by the computing unit 11, 13. As already described with regard to the embodiment shown in FIG. 4, the delay element 7 is designed in such a way that the frequency deviation of the diagnostic signal differs from the frequency deviation of the received signal, so that the distance simulated by the delay element corresponds to a distance that is not in the usual measuring range and so that separate evaluation of the received signal and the diagnostic signal can be ensured.

Figure 6:
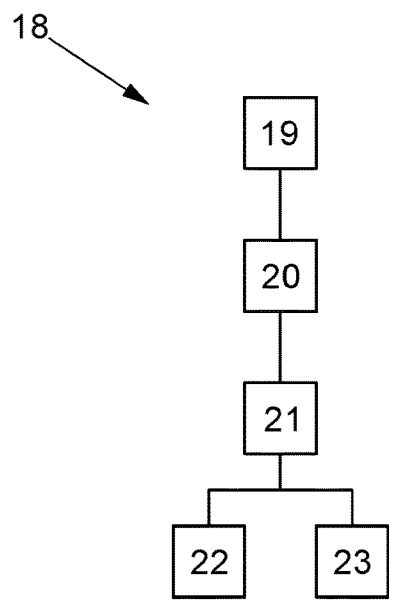
FIG. 6 illustrates a first embodiment of a method according to the invention.

FIG. 6 shows a first embodiment of a method 18 according to the invention for checking functionality of a device 1 for distance measurement, wherein the device 1 is designed according to any one of the embodiments shown in FIGS. 1 to 4.

The method 18 has the following steps:

emitting 19 an electromagnetic measurement signal by the signal generator 2, wherein a part of the measurement signal is fed into the first mixer 5 and wherein a part of the measurement signal is coupled into the diagnostic line 6 so that the measurement signal passes through the delay element 7 at least once and thus becomes the diagnostic signal, and optionally feeding the measurement signal into a second mixer 8, mixing 20 the diagnostic signal with the measurement signal in the first mixer 5 or in the second mixer 8 and generating a diagnostic mixed signal, detecting and evaluating 21 the diagnostic mixed signal by the evaluation unit 9, wherein the evaluation unit 9 determines the frequency of the diagnostic mixed signal for evaluation and compares it with a reference value and/or wherein the distance corresponding to the delay element 7 is determined from the diagnostic mixed signal and compared with a reference value.

If the measured spectrum and/or the measured distance deviates from a stored reference value, a message is output 22 and/or the measured distance value of the received signal is corrected 23 using the deviation.

As a result, the measuring accuracy of the distance measuring device can be increased by the described method for checking functionality, since internal errors which are not necessarily recognizable in the displayed measured value of the distance can also be detected and taken into account.

The invention claimed is:

1. A device for distance measurement, comprising:
at least one signal generator for generating an electromagnetic measurement signal;
at least one transmitting antenna for transmitting the measurement signal;
at least one receiving antenna for receiving a received signal, wherein the signal generator is connected at least to the transmitting antenna;
at least a first mixer, wherein a first input of the first mixer is connected to the signal generator and wherein a second input of the first mixer is connected at least to the receiving antenna, so that, during operation, the first mixer mixes at least the measurement signal generated by the signal generator and the received signal received by the receiving antenna;
an evaluation unit; and
an integrated diagnostic unit having at least one diagnostic line, wherein the signal generator is connected to the diagnostic line in such a way that, during operation, the measurement signal generated by the signal generator is at least partially coupled into the diagnostic line;
wherein the diagnostic line has at least one delay element, wherein the measurement signal is formed as a diagnostic signal after at least one pass through the delay element during operation;
wherein the diagnostic line is connected to the first mixer or to a second mixer, so that, during operation, the diagnostic signal is mixed with the measurement signal in the first mixer or in the second mixer to form a diagnostic mixed signal; and
wherein the output of the first mixer, and if present the output of the second mixer, is or are connected to the evaluation unit, and that the evaluation unit is designed to use the diagnostic mixed signal to check the functionality of the signal generator and/or of the evaluation algorithm.

2. The device according to claim 1, wherein the transmitting antenna and the receiving antenna are designed as a common transmitting and receiving antenna.

3. The device according to claim 1, wherein at least one coupling element is present;
wherein the signal generator is connected at least to the transmitting antenna via the coupling element, so that during operation the measurement signal is transmitted at least partially to the transmitting antenna via the coupling element; and
wherein the signal generator is connected to the diagnostic line via the coupling element so that, during operation, the measurement signal is at least partially transmitted to the diagnostic line via the coupling element.

4. The device according to claim 3, wherein the transmitting antenna and the receiving antenna are designed as a common transmitting and receiving antenna and, during operation, the received signal is transmitted to the first mixer via the coupling element.

5. The device according to claim 3, wherein the coupling element is designed as a directional coupler with four ports.

6. The device according to claim 5, wherein the coupling element is designed asymmetrically in such a way that the signal transmission into the individual ports is weighted differently; and wherein between 60% and 80% of the incoming power of the measurement signal is transmitted into the port in the direction of the transmitting and receiving antenna during operation.

7. The device according to claim 1, wherein the diagnostic line is limited by a reflection element.

8. The device according to claim 1, wherein the delay element is designed in such a way that the diagnostic signal has a frequency difference to the received signal, so that the distance simulated by the delay element corresponds to a distance which is not in the usual measurement range.

9. The device according to claim 1, wherein the delay element is designed as a waveguide or as a slow wave waveguide or as a microstrip line or as a coaxial line.

10. The device according to claim 1, wherein the evaluation unit is designed to carry out a method including the steps of:
emitting an electromagnetic measurement signal by the signal generator, wherein a part of the measurement signal is fed into the first mixer and wherein a part of the measurement signal couples into the diagnostic line so that the measurement signal passes through the delay element at least once and thus becomes the diagnostic signal, and optionally feeding the measurement signal into a second mixer;
mixing the diagnostic signal with the measurement signal in the first mixer or in the second mixer and generating a diagnostic mixed signal;
detecting and evaluating the diagnostic mixed signal by the evaluation unit; and
wherein the evaluation unit determines the frequency of the diagnostic mixed signal for evaluation and compares the frequency with a reference value and/or wherein the distance corresponding to the delay element is determined from the diagnostic mixed signal and compared with a reference value.

11. A method for functionally checking a device for distance measurement, the device including at least one signal generator for generating an electromagnetic measurement signal, at least one transmitting antenna for transmitting the measurement signal, at least one receiving antenna for receiving a received signal, wherein the signal generator is connected at least to the transmitting antenna, at least a first mixer, wherein a first input of the first mixer is connected to the signal generator and wherein a second input of the first mixer is connected at least to the receiving antenna, so that, during operation, the first mixer mixes at least the measurement signal generated by the signal generator and the received signal received by the receiving antenna, an evaluation unit; and an integrated diagnostic unit having at least one diagnostic line, wherein the signal generator is connected to the diagnostic line in such a way that, during operation, the measurement signal generated by the signal generator is at least partially coupled into the diagnostic line, wherein the diagnostic line has at least one delay element, wherein the measurement signal is formed as a diagnostic signal after at least one pass through the delay element during operation, wherein the diagnostic line is connected to the first mixer or to a second mixer, so that, during operation, the diagnostic signal is mixed with the measurement signal in the first mixer or in the second mixer to form a diagnostic mixed signal, and wherein the output of the first mixer, and if present the output of the second mixer, is or are connected to the evaluation unit, and that the evaluation unit is designed to use the diagnostic mixed signal to check the functionality of the signal generator and/or of the evaluation algorithm, the method comprising:
emitting an electromagnetic measurement signal by the signal generator, wherein a part of the measurement signal is fed into the first mixer and wherein a part of the measurement signal couples into the diagnostic line so that the measurement signal passes through the delay element at least once and thus becomes the diagnostic signal, and feeding the measurement signal into a second mixer;
mixing the diagnostic signal with the measurement signal in the first mixer or in the second mixer and generating a diagnostic mixed signal;
detecting and evaluating the diagnostic mixed signal by the evaluation unit; and
wherein the evaluation unit determines the frequency of the diagnostic mixed signal for evaluation and compares the frequency with a reference value and/or wherein the distance corresponding to the delay element is determined from the diagnostic mixed signal and compared with a reference value.

12. The method according to claim 11, wherein the method is carried out for each measurement operation or periodically or on demand of the user.

13. The method according to claim 11, wherein the signal at the second input of the first mixer corresponds to a linear combination of the received signal and the diagnostic signal, so that, at the first mixer, the linear combination is mixed with the measurement signal to form a combined mixed signal.

14. The method according to claim 13, wherein the delay element is designed in such a way that the frequency of the diagnostic signal and the received signal differ, so that the evaluation unit extracts the diagnostic mixed signal based on the frequency difference from the combined mixed signal.

* * * * *